United States Patent [19]

Babonneau

[11] Patent Number: 5,548,792
[45] Date of Patent: Aug. 20, 1996

[54] MULTI-USER INFORMATION RETRIEVAL SYSTEM WITH TRANSFER DELAY AND HIGH BIT RATE

[75] Inventor: Gérard Babonneau, Betton, France

[73] Assignee: France Telecom, Paris, France

[21] Appl. No.: 72,972

[22] Filed: Jun. 4, 1993

[30] Foreign Application Priority Data

Jun. 5, 1992 [FR] France ................................ 92 06885

[51] Int. Cl.$^6$ ...................................................... G06F 13/14
[52] U.S. Cl. ........................ 395/859; 395/860; 395/871; 364/DIG. 1; 364/238
[58] Field of Search .................................... 395/200, 250, 395/275, 325, 425, 600, 800, 291, 292, 296, 312, 859, 860, 871; 345/1, 2; 455/6.3, 7

[56] References Cited

U.S. PATENT DOCUMENTS

| | | | |
|---|---|---|---|
| 4,545,043 | 10/1985 | Anderson et al. | 369/32 |
| 4,805,134 | 2/1989 | Calo et al. | 395/600 |
| 4,985,767 | 1/1991 | Haghiri et al. | 358/133 |
| 5,043,810 | 8/1991 | Vreeswijk et al. | 358/133 |
| 5,245,322 | 9/1993 | Dinwiddie, Jr. et al. | 345/115 |
| 5,255,100 | 10/1993 | Urbanus | 358/231 |
| 5,276,866 | 1/1994 | Paolini | 395/600 |
| 5,311,324 | 5/1994 | Temma et al. | 358/342 |
| 5,321,520 | 6/1994 | Inga et al. | 358/403 |
| 5,371,548 | 12/1994 | Williams | 348/478 |

FOREIGN PATENT DOCUMENTS

| | | |
|---|---|---|
| 0303830 | 2/1989 | European Pat. Off. . |
| 9120144 | 12/1991 | WIPO . |

OTHER PUBLICATIONS

Shaharam Ghandeharizadeh, "Object Placement in Parallel Hypermedia Systems," Proceedings of the Tenth Conference on Very Large Data Bases, 1991, pp. 243–254.

Primary Examiner—Paul V. Kulik
Attorney, Agent, or Firm—Nilles & Nilles, S.C.

[57] ABSTRACT

To increase the bit rate of transfer of information from an audiovisual base to numerous requesting parties, it is proposed, when a request has been made by a requesting party, not to meet this party's request immediately but to make him wait for a given period. During this period, those other requesting parties who are asking for the same sequence are detected. At the end of a waiting period, the same sequence is sent to all these requesting parties. It is shown that, by delaying the transmission slightly, the real bit rate of transmission from the data base is increased by very substantial proportions without the need, moreover, to modify the technology of extraction of data elements from this base.

20 Claims, 4 Drawing Sheets

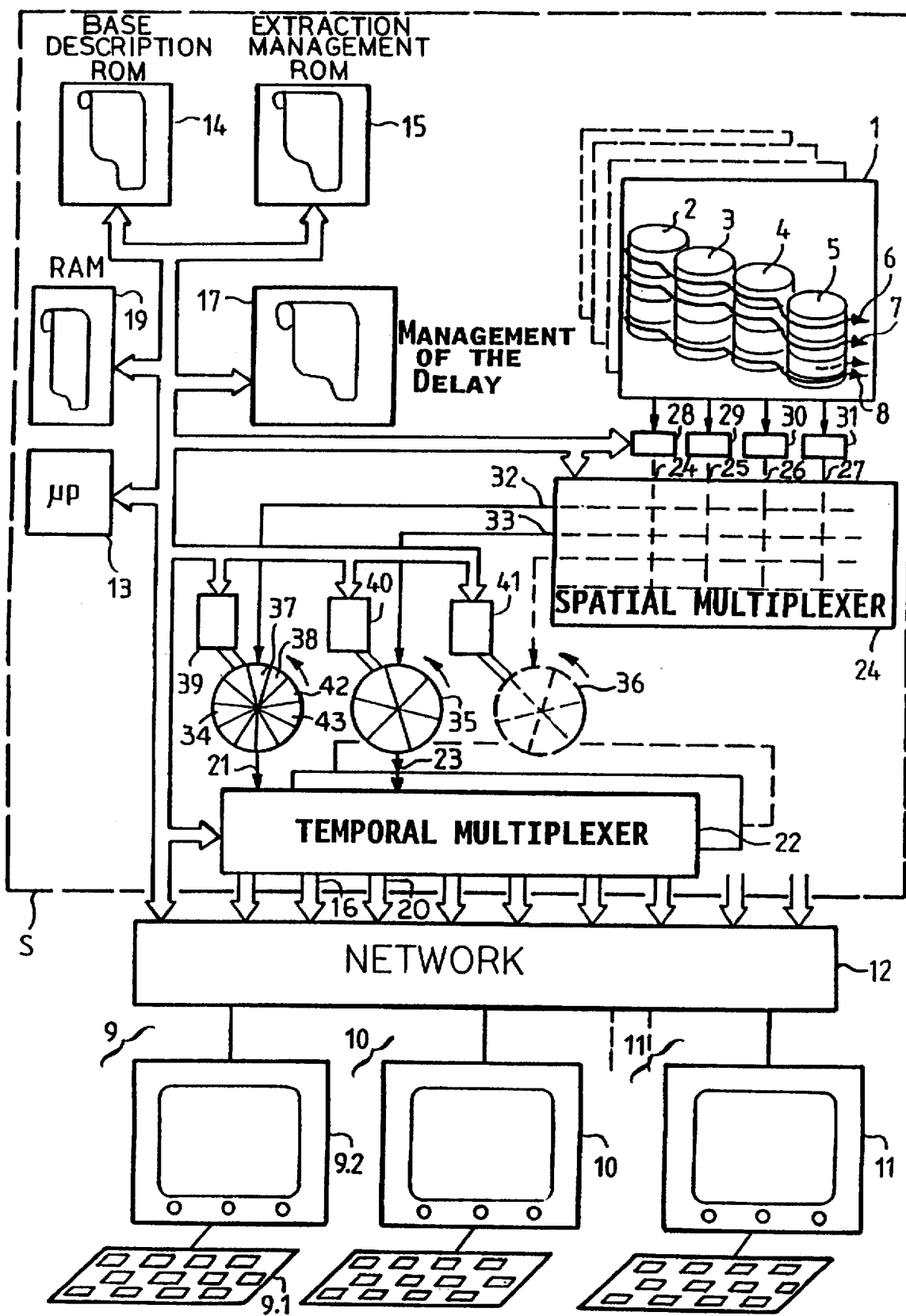
FIG_1

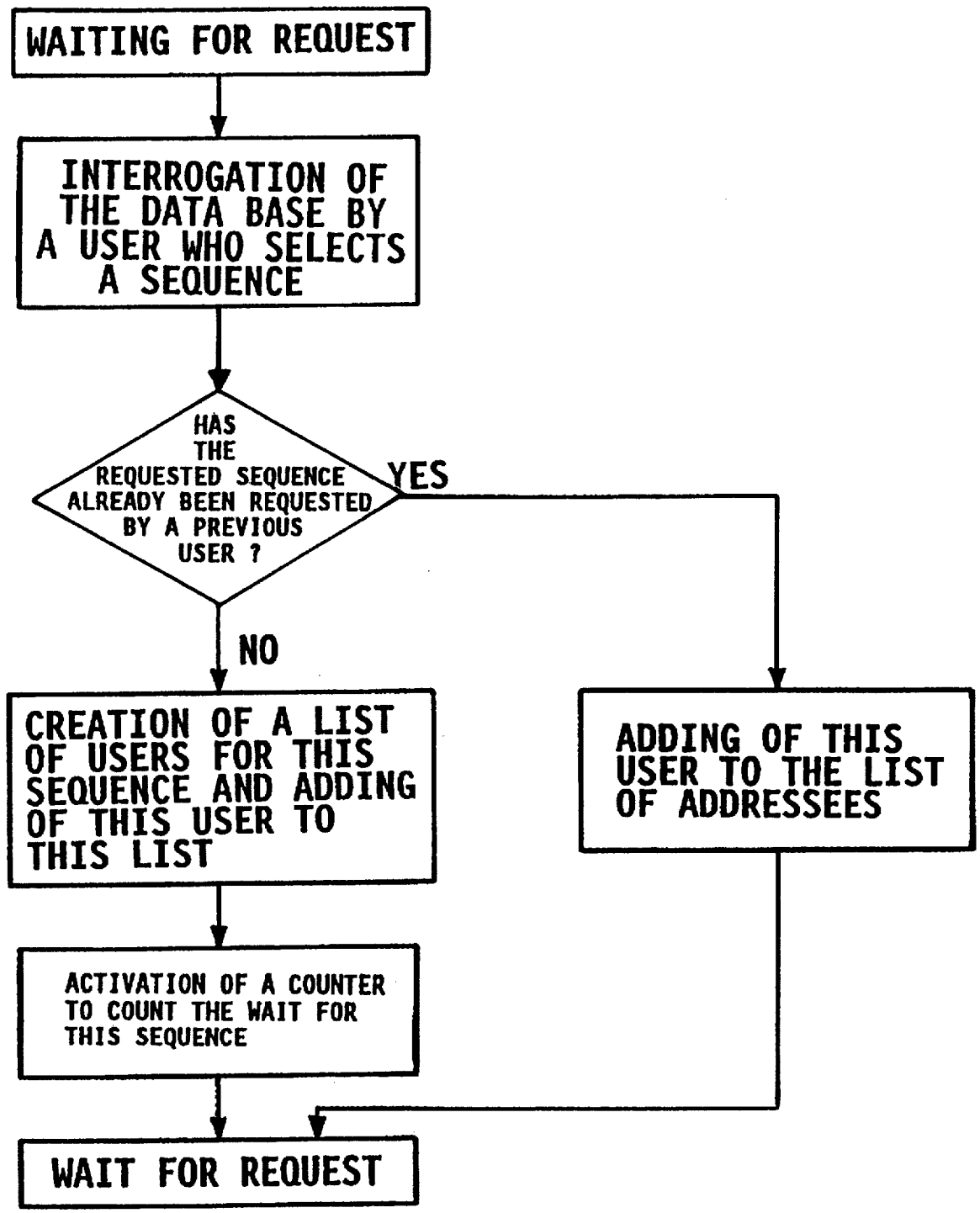

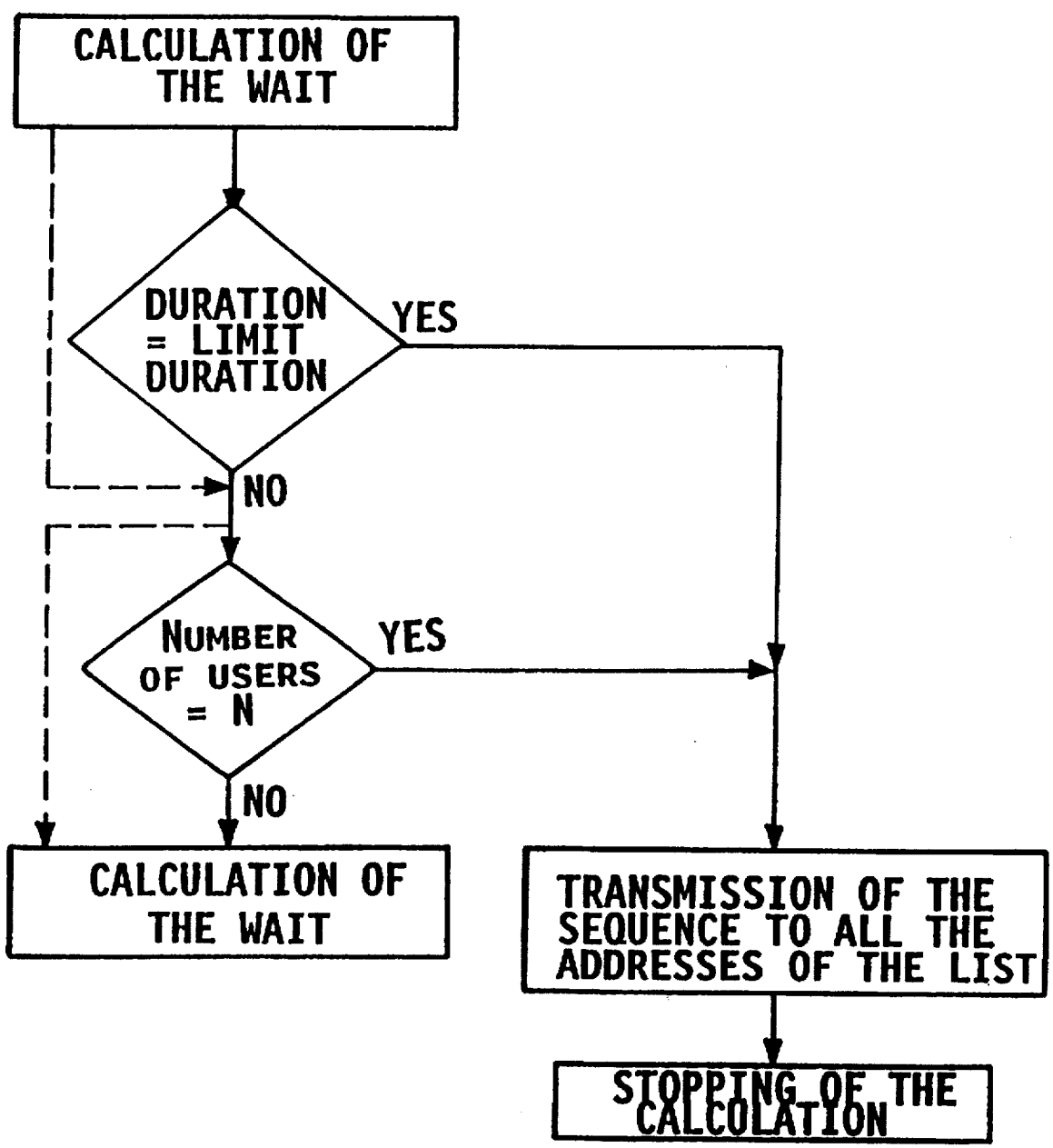
FIG_3

FIG_4
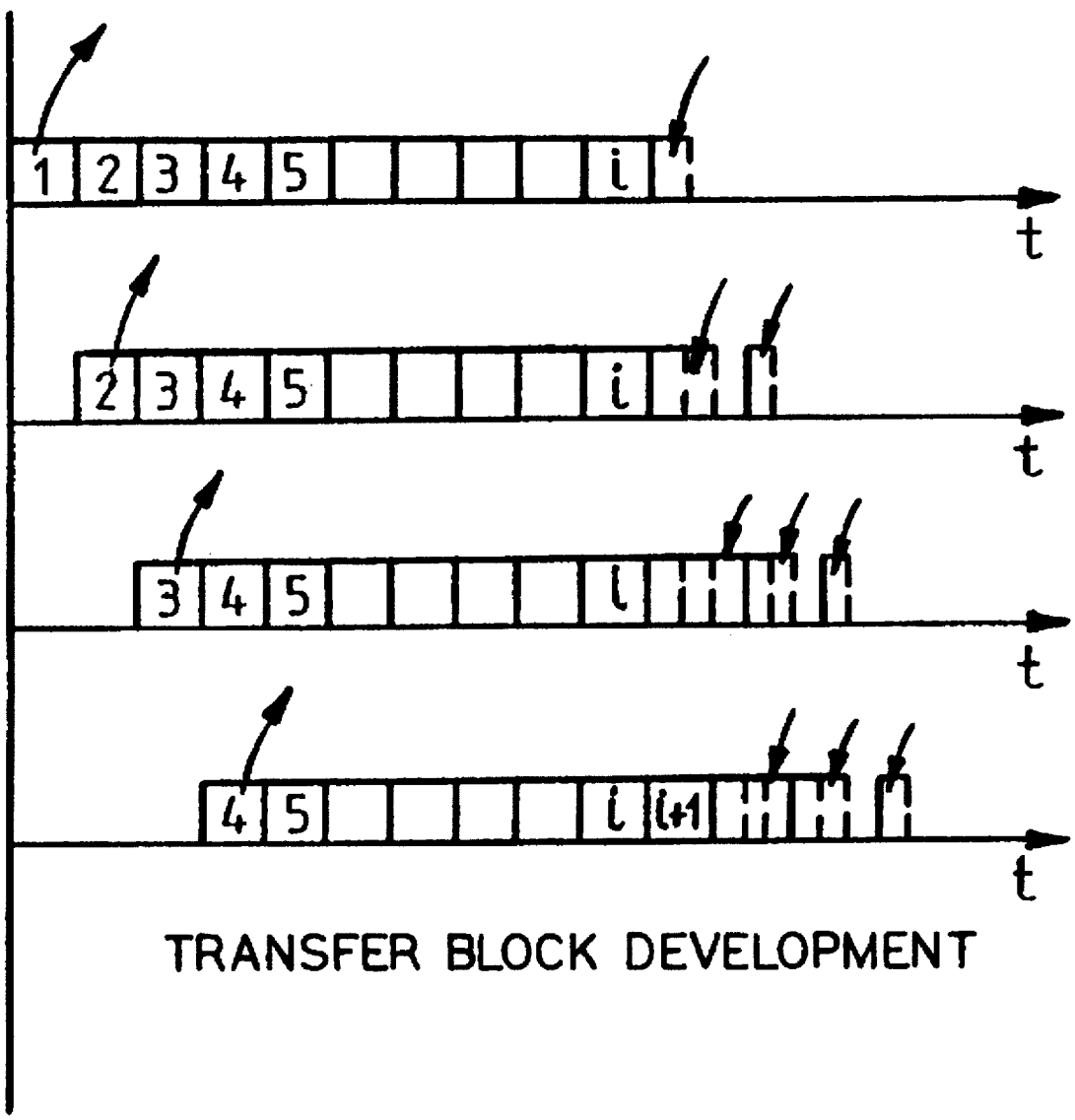
TRANSFER BLOCK DEVELOPMENT

MULTI-USER INFORMATION RETRIEVAL SYSTEM WITH TRANSFER DELAY AND HIGH BIT RATE

BACKGROUND OF THE INVENTION

1. Field of the Invention

The object of the present invention is an information retrieval system with high bit rate that can be used to send data elements extracted from data bases, for example through a public telecommunications network.

The aim of the invention is to match the bit rate of the data elements extracted from the data base (this bit rate being necessarily limited technologically by the hardware and software through which the data base is accessible) with a useful bit rate depending on the number of simultaneous users. This bit rate could be very high. The information retrieval system is constituted by these items of extraction hardware and software.

2. Description of the Prior Art

There exist known information retrieval systems having a nominal bit rate at present of the order of 1.50 to 6 Mbits per second. This bit rate corresponds to the consultation of audiovisual sequences simultaneously by several users. It is proposed to serve a large number of them.

The data bases referred to in the invention may be of any type, but they preferably relate to audiovisual type data bases wherein the image or auditive information elements are stored in the form of fixed images, possibly associated with sound sequences, and in the form of image sequences that may or may not be sonorized. For there now exist known ways, notably with the digitization of images and sounds, of storing numerous sequences of images or sounds with, in particular, the added contribution of compression. Given the increasingly pressing requirements with regard to so-called high definition images, it must be foreseen that the bit rate of information to be transmitted for a consultation of a sequence of images or sounds will keep on rising, with a corresponding improvement in the quality of the image received. A particular feature of audiovisual type information elements is that the quantity of information elements to be transmitted depends on the length of the sequence chosen by the user. Thus, sequences with a duration of one or more minutes have been envisaged. This, even with a high compression of the images, leads to the transmission of a major quantity of information, sometimes more than 10 megabytes.

Another example of the implementation of data bases such as these is described in an article by Shahram Ghandeharizadeh et al, "Object Placement In Parallel Media System" and has been disclosed in the conference reports of the Tenth Confererence on Very Large Data Bases, Barcelona, September 1991, pp. 243–254. In this example, a consultation of "Compton's Multimedia Encyclopaedia" is envisaged.

This article makes reference to a difficulty of presenting video images because these images imply an information bit rate of 60 Mbits per second while the standard data storage devices, notably microcomputer hard disks, are capable of a bit rate of no more than 5 to 10 Mbits per second. The approach recommended by this article to resolve this problem consists in distributing the data base among several storage media or carriers. This distribution is done in such a way that a same sequence, to be distributed to a user who claims it, is not taken from a single medium or carrier but is taken block by block from different media or carriers. Consequently, the passband required for transmission in real time is obtained by an aggregation of the elementary passbands of which these carriers are capable. In practice, the outputs of these carriers must be multiplexed before being transmitted, in such a way that, on the reception side, the requisite bit rate is obtained. In addition, given the fact that each carrier, when it has come into action, has a bit rate lower than the requisite bit rate, this article furthermore evokes the possibility that each carrier will preload a buffer memory with a part of an extracted data block, in such a way that the reading system reads firstly the data elements stored in this buffer memory and, secondly, the data elements distributed at the end of the part on the carrier itself.

Despite all the advantages presented by this technique, it does not resolve the above-mentioned problem. It is an object of the present invention, to this end, to exploit the bit rate capacity of a data base such as this, not for a single user requiring a very great information bit rate but for several users, each receiving a smaller bit rate, so that the totality of the extracted bit rates is within the physical limits of the machine. Thus, assuming that the maximum bit rate of the data base can be used to serve twenty users simultaneously, when the twenty-first user appears, the data base will be fully engaged and this user will be unable to obtain satisfaction. The longer the sequences, the more disagreeable will this constraint be for the user. If the wait is for only one minute, the problem may not be too serious. On the contrary, if the sequences are of the order of ten to fifteen minutes, the wait is unacceptable.

The invention deals with another constraint related to the length of the sequences. These sequences cannot entirely be stored in the user's terminal. The volume of information is far too great. Moreover the storage memories of these terminals too lack the bit rate needed to transmit the sequences properly. They therefore have to be displayed in these terminals in real time, i.e. without any break in sequence for each of the users served. This problem, which is a particularly sensitive one as regards audiovisual sequences, is resolved by the invention at the same time that of serving several users.

In the invention, to resolve these problems, the specific features proper to the audiovisual sequences that users wish to receive have been highlighted.

Firstly, unlike in the consultation of a standard type of data base, it appears to be probable that the number of sequences recorded and hence requested by users will not be excessively high. It has then been observed, in the case of a simultaneous consultation by a large number of users, that it is probable that identical requests are presented fairly frequently to obtain the same sequences.

In the invention, therefore, the idea has arisen of overcoming the drawbacks mentioned by making a requesting party wait for a certain period of time before serving him the sequence that he has asked for. During this waiting period, the parties wishing to receive the same sequence are detected. At the end of this waiting period, if several requesting parties have asked for the same sequence to be sent, this sequence is sent to all of them at the same time. The bit rate of the data base can then be multiplied by the number of requesting parties seeking to see the same sequence at the same time, without furthermore in any way modifying the technology for the extraction of the data from the data base.

To obtain this result, a multiplexing circuit is used. This circuit is capable of setting up the interconnections of the outputs of the data base towards users. This circuit, interposed between the output of the data base and the users, enables the connection of several users to a same data base output. In one preferred example, this multiplexer circuit is a temporal multiplexer. However, it can also be a spatial multiplexer. It is possible, for example, with a waiting period of the order of one to five seconds which may be periodic or consecutive to a first request, to considerably increase the bit rate for the sending of the data from the base. The information retrieval system of the data base then becomes a retrieval system with a higher bit rate.

Furthermore, by fragmenting the sequences into data blocks, where the blocks are stored in a distributed state in different information carriers, it is shown that the time for which the users have to wait because the data base is engaged may become negligible, of the order of a fraction of a second. If, in this context, this data base is furthermore made use of by numerous users who no longer ask for identical sequences but for different sequences, problems relating to conflicts over the simultaneous extraction of different data blocks out of a same support may arise. Indeed, given the large number of audiovisual sequences that are extracted simultaneously from the information retrieval system, the management of this information retrieval system becomes hazardous, and risks may arise of a break in the transmission of the blocks, hence the transmission of the sequences. The invention also resolves this problem by constituting, according to another embodiment, a buffer memory in which the extracted blocks are stored as and when they are extracted. They are then stored therein, either at storage addresses corresponding to the order of their extraction, together with an index showing their real place in the sequence or, preferably, at addresses in the buffer memory that directly follow data block addresses which should normally be sent immediately before these data blocks. In this case, the information retrieval system is never neutralized by waits for the resolving of these conflicts, for each sequence sent to one or more users is constituted dynamically as a store of information. The volume of this store is sufficient to attenuate the conflicts of extraction that may occur at the output of the carriers.

Preferably, of course, the buffer memory is used to play both roles: the waiting role used to identify all the users asking for a same sequence and the buffer role to attenuate the problems of conflict over extraction that arise.

SUMMARY OF THE INVENTION

An object of the invention therefore is an information retrieval system with high bit rate to serve several users simultaneously, comprising:

a base of sequences of data elements that can be consulted by these users, circuits for the interconnection of this base with these users, and extraction circuits to extract sequences of data elements from this base as a function of requests sent out by these users, wherein said information retrieval system comprises:

means to delay a transfer of a sequence of data elements to a user, and wherein the interconnection circuits comprise means for the simultaneous transmission to several users of a same sequence of data elements.

An object of the invention is also an information retrieval system with high bit rate comprising:

a base of sequences of data elements that can be consulted by these users, each sequence of data elements being constituted by several blocks of data elements distributed in storage in different carriers used to memorize data elements, circuits for the interconnection of the carriers of this base with these users, to extract sequences of data elements out of this base as a function of requests sent by these users, and to send them to these users, wherein these interconnection circuits comprise:

a buffer memory to store blocks of data elements extracted from these supports before they are sent;

and means for the arranging, in this temporary memory, of these extracted blocks of data elements in an order that corresponds to the efficient progress of the sending of the sequences, this order being independent of the order of their extraction.

BRIEF DESCRIPTION OF THE DRAWINGS

The invention will be understood more clearly from the following description and from the figures that accompany it. These figures are given purely by way of an indication and in no way restrict the scope of the invention. Of these figures:

FIG. 1 shows a schematic view of the information retrieval system with high bit rate according to the invention;

FIGS. 2 and 3 show flow charts of operations performed by the information retrieval system of the invention to serve several users simultaneously;

FIG. 4 is a timing diagram showing the development of the transfer of the blocks during the sending of a sequence.

MORE DETAILED DESCRIPTION

FIG. 1 shows an information retrieval system S with high bit rate according to the invention. This information retrieval system S has a data base 1 which, in the application preferably envisaged by the invention, is a base containing sequences of audiovisual data elements. According to the teaching of the article referred to here above, the data base 1 may comprise several information storage carriers, such as 2 to 5, in which a same sequence may be distributed so as to obtain a nominal bit rate for the output of the data elements of the sequence that is greater than the nominal bit rate of each of the carriers. The base 1 may thus contain several sequences, for example the sequences 6 to 8. Each sequence comprises a certain number of data blocks. These data blocks, having a size of 16 kilobytes for example, are arranged in successive carriers 2 to 5 as a function of their chronological rank in the sequence. For N carriers used, there are thus groups of N successive blocks of data elements. The first block of a group is placed in a first carrier and so on until the Nth block of the group which is placed in the Nth carrier. The groups of blocks of data elements of a sequence are also organized chronologically and arranged in the same N carriers so that data blocks of a next group are also arranged in the N carriers directly after the data blocks of the previous group.

Users, for example users such as 9, 10 and 11, are connected to the base 1 of the information retrieval system S, for example by means of a telecommunications network 12 with a bit rate has been given the capacity needed to convey the sequences. The network 12 may be a specialized network belonging entirely to the community of users 9 to 11 or to an ISDN type public network (integrated services digital network) or a V21 or ATM (Asynchronous Transmission Mode) type of asynchronous network or an FDDI or Ethernet type of private network.

Beyond the network 12, the data base 1 is connected with the users 9 to 11 by means of interconnection circuits. These interconnection circuits comprise, firstly, standard type circuits and, secondly, circuits according to the invention. The extraction of the information elements from the disks constituting the data base 1, towards the users 9 to 11, is done by interconnection circuits and circuits for the management and control of the transfers. These circuits may comprise microprocessors. They are connected to each other, either by a single bus or by specific buses. They may also be connected to each other by data transfer means comprising transputers which are units capable of processing information elements at the same time as they convey other information elements. This processing may include a temporary storage system. The term "circuit" must be taken in a broad sense. It is not restricted to the purely hardware aspect of these circuits. These circuits notably comprise microprocessors, such as a central microprocessor 13, capable of bringing about the execution of the programs of instructions contained in program memories such as the memories 14 and 15.

The following is the standard operation of the information retrieval system S. When a user 9 wishes to get connected to this information retrieval system S, this user 9, by means of a control desk containing a microprocessor, a control keyboard 9.1 and a display screen 9.2, brings about the execution of a protocol for connection to the information retrieval system S. On the display screen 9.2, the user may see, firstly, the progress of the connection operations. On this screen, he may furthermore receive the transmitted images coming from the base 1.

Once the connection with the information retrieval system S is set up, the central microprocessor 13 of the information retrieval system S takes over the connection. Depending on a description of the data base contained in a memory 14, the microprocessor 13 sends data elements to the screen 9.2 of the user 9. These data elements may be, for example, of the teletext type (hence with a simplified protocol) constituting a form of the description of the base that can be understood by the user. This description may quite simply contain a list of all the sequences of data elements such as 6 to 8 which can be consulted with the base 1. Using the keyboard 9.1, the user 9 is then led to choose the sequence that he wishes to receive. Once this choice has been made, the central microprocessor 13 launches the operation for extracting the chosen sequence, if need be by using a program for the management of the extraction contained in a memory 15. The audiovisual sequences are organized as in the article referred to. They are fragmented into blocks of limited length that are distributed over several disks, for example by the use of a ROUND-ROBIN technique. Each of these fragments can be accessed by a file management system or a data base management system whose techniques are furthermore known. However, in a preferred variant described here below, the characteristic of the wait is combined with the characteristic of the partition of the sequences. The sequence extracted from the base 1 is then sent to the port 16 of the information retrieval system S and finally reaches the screen 9.2 of the user 9.

In the invention, to increase the bit rate of the information retrieval system S, it has been chosen not to prompt the extraction and/or the transmission (but preferably not to prompt the transmission) of the sequence as soon as the request sent by the user has been sent to the information retrieval system S. On the contrary, a delay is prompted. This delay is managed in FIG. 1 by a memory 17 comprising a program for the management of the delay and for triggering the start of the transmission of the sequence, at the end of the delay. During the extraction of the sequence from the base 1, the extraction program contained in the memory 15 is carried out. The memories 15 and 17 are preferably associated with their own microprocessors which implement the programs for the extraction and management of the delay.

For the duration of this delay, which may range from a fraction of a second to some seconds, there is a wait to ascertain whether another user requests the sending of the same sequence. Statistically, if the sequence is of interest, another user, for example the user 10, will request the same sequence before the end of this delay. In view of the time taken by the user 10 to think over the matter, his request is validated only by his final action requesting the transmission of the sequence.

To implement the invention, in one approach it has been chosen to constitute a list of users in a dynamic memory 19: the users 9 and 10 who wish to receive the same sequence are mentioned in the list pertaining to this sequence. The memory 19 may physically be the same memory as the memory 17, associated with its own microprocessor, which sets up the delay. The lists in the memory 19 comprise the addresses of the output ports of the information retrieval system S, the ports 16 and 20 to which these users 9 and 10 are connected. Once the request has been made, for the first user 9, the output port 21 of the data base 1 on which the called sequence is to be sent will be determined. A list of the memory 19 is therefore, in practice, a list that has devolved dynamically upon the port 2i and upon the sequence pending commencement.

There are known ways of using connection circuit 22, for example similar to those of the switched network 12, to connect the output port 21 of the base to the output port 16 Of the information retrieval system S so as to send the sequence to the user 9.

An interconnection circuit 22 that carries out this operation is a multiplexer. In the invention, it is capable of carrying out a selective transmission. The transmission relates to the dispatching of a message, a sequence, to every possible user. The selection relates to carrying out this transmission to chosen users. A circuit 22 such as this may furthermore be integrated with the network 12 or with the data base 1. Its external presentation is above all related to the need to explain its working.

This circuit 22 of the invention preferably comprises a temporal multiplexer having M inputs connected to the base and P outputs connected to the users. This multiplexer is capable of connecting any one of its M inputs to any one of the P outputs. The multiplexer 22 of the invention has the capacity to deliver the data elements successively to the outputs 16, 20 and others, at a rate far greater than the normal rate of transmission of these data elements, so much so that it is even capable, if necessary, of serving the P outputs from a single input. For example, if the data elements to be transmitted are of an audiovisual type, then this normal bit rate is related to a display of these data elements on the screens 9.2. The circuit 22 preferably has buffer memories to then deliver the data elements received at high bit rate to the screens 9.2 at a rate compatible with that accepted by these screens 9.2.

Advantage is derived from this particular feature. Thus, after a data block has been sent to the port 16, the same data block is sent to the port 20 and then again to another port if necessary, provided that this other port itself also corresponds to a user mentioned in the list 19. Thus, if the bit rate of the temporal multiplexer is ten times greater than the normal bit rate, ten users can be connected simultaneously to a same output 21 of the base. This number can even be increased if other multiplexers are placed downline with respect to the multiplexer 22. For the users, there is almost no delay in the display for, with a temporal multiplexer having a bit rate of 150 Mbits per second, the transmission of one and the same 16 kilobyte block ten times to ten different users takes only 8 ms. In the invention, with a temporal multiplexer, a same output 21 is connected several times to several users. Consequently, the useful output bit rate of the base is greatly increased by the performance values of the temporal multiplexer.

This embodiment can nevertheless be replaced by another system, notably a spatial multiplex interconnection of the CROSSBAR type, or again a system of communication with a computer bus and a destination addressing of the data elements. Normally, in a spatial multiplex connection circuit, one output is connected only to one user. In the invention, a circuit of this kind is modified for the connection, on demand, of one and the same output 21 to several users. It is enough to set up the electrical connection of several ports 16 to one output 21. The circuit 22 may also be integrated with the output circuit of the data base 1. The only particular feature of this circuit is that it should now make it possible, according to the invention, to transmit one and the same information element to at least two different users whereas, previously, this type of use was conventionally ruled out.

Naturally, if the data base 1 is called at the same time by another set of users wishing to view another sequence, there is a constituting of another list in the memory 19 as well as the triggering of another delay prompted by the program 17. For example, at another input 23 of the circuit 22, the figure shows another extraction of another sequence from the data base 1, sent to other requesting users, simultaneously with the sending to the users 9 and 10 of the first sequence studied up till now.

FIG. 2 shows the flow chart of a part of the program for the management of delays according to the invention, performed by the central microprocessor 13 or by the microprocessors associated with the memories 17 and 19. In normal times, these microprocessors are in a state of waiting for requests. When a requesting party, the requesting party 9, makes a request, he interrogates the data base to select a sequence. The program then comprises a test to ascertain that the requested sequence has already been requested by a previous user. When this is not the case, the program comprises instructions to prompt the creation of a list of users for this sequence. Typically, the list to be created is the list in the memory 19. At the same time, the program prompts the activation of a counter to register the wait for this sequence. Once these operations are done, the concerned microprocessor again places itself in the state of waiting for a request to perceive the appearance of a following request. When the following request arrives and if it is a request for the same sequence, the program is designed to add the additional user to the list of addressees for this sequence.

In fact, when the program creates the list 19 for the first user 9, it also chooses a base output 21 among all the outputs possible in the circuit 22. When the user 10 appears, the adding of the user to the list entails the adding, to the common pool, of a path for the transmission of the information. At the end of the waiting period, the requested sequence is transmitted.

FIG. 3 shows a flow chart of the wait counting or calculating operation. In practice, it is possible to organize the wait in different ways. Firstly, it can be determined that the wait will be one of limited duration. In this case, this wait may be triggered by the presenting of a request like the one that has been seen up till now. Or else the wait may be triggered periodically by means of a clock driven by the central microprocessor 13. Another way of operating consists in prompting a delay whose duration is not fixed but variable. The variable character of this duration may then be due to the number of requesting parties who are interested by the same sequence.

The wait counting or calculating operation therefore takes place as follows in the first variant. If the limit duration is not reached, the wait calculating continues. By contrast, if the limit duration is reached, or if a maximum number of users is recognized, the requested sequence is transmitted to all the addressees of the list at the same time as the calculating operation is stopped. As a variant, the wait calculating operation may consist in making periodic measurements of the number of users who have asked for a sequence and are identified in a list. If this number is smaller than a limit number N, the wait continues. However, if this number of users reaches the limit number N, then the triggering of the transmission of the sequence occurs at the same time. At the end of the transmission the list, in both cases, is erased. Of course, it is possible to couple the notion of limited duration and of the limited number of users to trigger the transmission. In a preferred way in this case, the number N will not be a constant number but will be a number depending on a measurement of the number of users who have sent a request to the base during a previous period. The greater this number, the longer will be the this wait so that an even greater number of requesting parties is served in the following period. Naturally, the wait should not be greater than the duration of the sequence for this would make no sense.

To place the sequence that has to be sent to the users at the disposal of the output 21 of the base, the invention uses a multiplexer 24 which may be of the spatial or temporal type but is preferably spatial. This multiplexer 24 has as many inputs as there are different carriers in the base 1. It has as many outputs as there are outputs such as 21 planned or possible for the base. The transfers of the data blocks between the carriers 2 to 5 of the base and the corresponding inputs 24 to 27 of the multiplexer 24 are managed by microprocessors, respectively 28 to 31. These microprocessors 28 to 31, acting under the control of the central microprocessor 13, organize the extraction of the data blocks of the groups, successively from the carriers 2, then 3, then 4, then 5 and then again 2 for a following group and so on. The microprocessors 28 to 31 command the carriers 2 to 5. They operate as follows: they are loaded with a stack of extraction instructions and carry out the instructions of this stack one after the other.

The multiplexer 24 is shown schematically as a CROSSBAR type multiplexer. For a sequence, it successively receives the data blocks at its inputs 24 to 27 and, by the dynamic and synchronized establishment of its connections, it orients the transfer of all the data blocks received, relating to the sequence, to only one of its outputs: for example, herein, the output 32 which is therefore related to the output 21 mentioned here above. In one example, the multiplexer 24 has one or more microprocessors for the dynamic setting up of one or more connections of the microprocessors 28 to 31 with the outputs 32 to 33. At the same time as it transmits a sequence to the output 32, the multiplexer 24 may have to transmit another sequence on another output 33. Normally, this other sequence too comes from the carriers 2 to 5, or carriers 3 and 4 only, or another combination of the carriers. This combination is memorized in the memory 15, and the microprocessor 13 loads the instructions to be executed by the microprocessors 28 to 31 as a function of this combination.

The result thereof may be that a carrier, for example the carrier 3, may be called upon for the transmission, to the output 32, of a block of data elements corresponding to a called sequence, at the same time as it may be called upon to transmit a block of data elements corresponding to another sequence to the output 33. The carrier 3 cannot accomplish both these tasks at the same time. Owing to this conflict, one of the two outputs 32 or 33 would have to wait, to the detriment of the overall bit rate of the information retrieval system 1. To resolve this problem, the invention interposes buffer memories 34 to 35, associated with microprocessors 39 to 41, between each of the outputs 32 to 33 of the multiplexer 24 and the real outputs 21 or 23 of the base 1. These buffer memories will then play the two roles provided for in the invention. Firstly, by the operation of temporary memorizing, they will delay the sending of the sequence extracted from the data base. Advantage is taken of this delay for the distribution of a same sequence, at the same time, to all users who wish to have it.

Furthermore, when conflicts of extraction occur, the microprocessors 28 to 31 are capable of carrying out operations in series for the extraction of the data blocks from the carriers. And, when a microprocessor has to carry out two extractions simultaneously, it carries them out one after the other. In other words, a sequence is momentarily extracted with one data block less. The extracted data blocks are stored in memory compartments such as 37 and 38 of the memories 34 to 36. This storage operation is controlled by the microprocessors 39 to 41 respectively associated with each of the memories 34 to 36. During this storage operation, the blocks receive a storage address which gets incremented naturally with the chronological rank of the block in the sequence. Preferably, if the block is lacking, the memory compartment is left vacant. In this case, the reading of the buffer memory 34 to 36 will be sequential. As a variant, the blocks may be loaded into the compartments whose addresses get incremented with the order of arrival of the blocks. In this case, they are furthermore assigned an index relating to their chronological place in the sequence. In this case, the reading of the buffer memory is uncertain. It follows the rising order of the chronological indices.

As soon as the conflict disappears, the microprocessors 28 to 31 concerned by this conflict intervene in the extraction on a priority basis to extract the missing block of data elements. For example, a block has been extracted from the carrier 2, it has not been possible to extract a block from the carrier 3, and hence the next extracted block has been extracted from the carrier 4. The missing block of data elements extracted from the carrier 3 is then placed by the microprocessor 39 in the buffer memory 34, preferably at its right position in this memory. This will in no way delay operations of extraction from other disks.

The buffer memories 34 to 36 are rotating memories that are read simultaneously with the operation of writing in the memory. There is only one shift between the reading addresses and the writing addresses. The data blocks stored temporarily between these two addresses correspond to the delay sought by the invention.

This means that, in this preferred variant, the extraction is anticipated. It is begun as soon as the first request is recorded in the list 19, which is created on this occasion. However, the transmission is delayed. Preferably, an immediate extraction is done to make immediate use of the available disks. Thus, no risk is incurred of an insoluble conflict of extraction as would be the case if the extraction were to be done only at the last instant.

According to the preferred variant, the sequence of the carriers 2 to 5 is extracted entirely or partly; it is stored entirely or partly in a buffer memory (with a sufficient nominal bit rate) and then, at the end of a wait, this sequence is transmitted from this buffer memory. All that is needed then is a memory with a sufficient nominal bit rate. The media may have a slower bit rate. Above all, with the rearrangement of the blocks, the conflicts of extraction are easily managed.

The operation then proceeds, with reference to FIG. 4, as follows. The fractioning of the sequences into blocks, as described in the above-mentioned article, is used. The bit rate of the base 1 is then increased for, since a carrier is responsible for the sending of a block, as soon as this block has been sent, this carrier is again available to send another block to other users of another list. Furthermore, the wait is reduced proportionately to the fractioning of the sequence in the carriers. In this case, the auxiliary buffer memory need not contain the entire sequence and need not be bulky. The microprocessor 39 of each buffer memory carries out a program with the task of managing anticipation for the sending of each sequence. The same microprocessor 39 also carries out the broadcasting of the sequence to the users who are connected to the output 21.

The management of the anticipation consists in loading the first i blocks with a sequence in a buffer memory 34. During a period of time T for the loading of this buffer memory 34, the users asking for the same sequence are detected. The waiting time T may be greater than the time taken to load the first i blocks in the memory 34. The start of the loading of the buffer memory can be deferred but it is preferably begun as soon as a first request for a sequence has been recorded. During this period of time T, the output 21 is parametrized so that it also ensures the future transmission of the sequence to any newly connected user. Once the period of time T has elapsed, the sequence begins to be sent on the network 12 to all the users who have been connected.

To see to it that a user who validates his request precisely at the end of the duration T is taken into account, a semaphore type device between the base 1 and the memory 34 ensures that the request is not lost. In other words, another list 19' is created for a same sequence before the closing of the list 19 for this sequence, and before the closing of the list has led to the sending of the sequence.

The sequence is then sent as follows. When a block is sent on the network 12, the microprocessor 39 asks the base 1 to load the block n+i in the memory 34. Several situations may arise depending on whether the loading in the memory 34 is faster than the transmission in the network 12 or not, and depending on whether the base 1, the carrier concerned by the delivering of the block n+i, is available or engaged.

If the loading bit rate is faster than the transmission, and if the concerned carrier of the base 1 is available, the operation takes place smoothly. If the loading is not as fast as the transmission on the network 12, it means in fact that the bit rate of the storage medium, the hard disk, is too slow. In this case, shown in FIG. 4, when a block 1 is sent, a block i+1 is called to be loaded. When a block 2 is sent, the block i+1 continues to be loaded, while a block i+2 is called. When a block 3 is sent, the blocks i+1 and i+2 continue to be loaded, while a block i+3 is called. Continuing in this way, with the passage of time, the blocks are sent at their rate of transmission without this leading-to a break in transmission even though each carrier delivers at a low bit rate. It is enough simply for i to be greater than the ratio of the transmission bit rate to the bit rate of extraction from the carriers. The value of i, with a safety margin, provides information on the necessary capacity of the buffer memory 34. In this case, the output 32 of the multiplexer 24 is in fact duplicated to give as many desired possible outputs as there are different blocks to be loaded simultaneously into the memory. With the needs presented by the situation shown in FIG. 4, four outputs 32 are needed for a sequence. These four outputs 32 are connected respectively to the inputs 37, 38, 42 and 43 of the memory 34. When this memory 34 "runs" in writing mode, the input 37 is connected upline with respect to the input 43, and makes a leap of four positions. In this case, the multiplexer 24 is engaged four times longer by the sending of a sequence. This leads to providing for a substantial number of carriers to prevent a risk of conflict, but the principle of the invention remains the same.

If a carrier constituted by a disk is engaged, if it cannot send a block i+n at request, this block may be sent subsequently. The extraction commands are, for example, managed by a stack mechanism of the first in first out (FIFO) type. The microprocessors 28 to 31 may act asynchronously. Since an extracted block is identified furthermore by its position in the sequence, it will be placed by the microprocessor 39 of the memory 34 in its right place in the buffer memory 34. Or else, if the reading of this buffer memory 34 is not necessarily sequential, the multiplexer 22 carries out a microprogram to send the blocks in the right order.

It can be seen that this preferred mode of operation enables the serving of several users, the managing of the problems of divergence between the extraction bit rate and transmission bit rate, the efficient management of the problems of the engagement of the base and, at the same time, the settling of the problem of conflicts. In practice, the hard disks used have bit rates of the order of 5 Mbits per second while the sending of the sequences according to the MPEG 1 standard requires a bit rate of 1.5 Mbits per second. By making a call, in the buffer memory, for a new block as soon as a previous block has been sent, the matching of the bit rates is resolved simply. It is therefore possible to extract high bit rates, whether it is to serve several users simultaneously with MPEG1 type sequences, or appreciably high bit rates for a more limited number of users, or even a very high bit rate for a single user, if this user should be the only one to ask for a sequence such as this.

The multiplexer 22, the buffer memories 34 and the microprocessors 39 are preferably constituted, together, by a machine with parallel architecture. A machine with parallel architecture or massively parallel architecture is characterized by numerous microprocessors 13, 28 to 31 and 39 to 41, working simultaneous in order to share out, the work among themselves, and to thus obtain far shorter processing times than would be the case with a single microprocessor, even a high-performance microprocessor. Each microprocessor is specialized in a part of the processing that it carries out with maximum efficiency, and it exchanges the intermediate results that it produces, or that it needs, with its neighbors.

Sometimes, the data elements to be processed and the results obtained are exploited from disks of the base 1 that can be accessed directly by the machine with parallel architecture. A system for the management of distributed files is added to the machine with parallel architecture to gain direct access to the data elements memorized in numerous disks that can be accessed in parallel, for high efficiency. The results (extraction of audiovisual sequences) produced by the machine with parallel architecture are sent directly on a communication networks 12 (or networks) at high bit rate, the interfaces of which, microprocessors 39 to 41, are integrated into the parallel architecture machine itself. A machine such as this is, for example, based on transputers, of the VOLVOX type marketed by the firm ARCHIPEL SA, Annecy, France or of the Tnode type marketed by the firm TELMAT, Soultz, France.

What is claimed is:

1. A method of transmitting a data sequence from a data base to a plurality of users, the method comprising the steps of:

storing the data sequence in the data base, the storing step including the steps of
dividing the data sequence into a plurality of data blocks, and
storing the data blocks in a plurality of carriers;

receiving a first request from a first user for the sequence;

extracting data blocks from the plurality of carriers of the data base, the data blocks being extracted in an order which is different from the order in which the data blocks are to be transmitted;

rearranging the data blocks into the order in which the data blocks are to be transmitted;

delaying the transmission of the sequence to the first user;

receiving a second request from a second user for the sequence, the receiving step occurring during the delaying step, the receiving step including a list compiling step wherein a list of users who have requested the data sequence is compiled; and simultaneously transmitting the data sequence to the all of the users on the compiled list of users after the delaying step.

2. A method of transmitting a data sequence from a data base to a plurality of users, the method comprising the steps of:

providing a multiplexer, the multiplexer having at least one input connected to the data base, and the multiplexer having a plurality of outputs connected to the plurality of users, the plurality of outputs including a first output connected via a first transmission path to a first user, and a second output connected via a second transmission path to a second user;

storing the data sequence in the data base;

receiving a first request from the first user for the sequence;

extracting the sequence from a carrier of the data base;

delaying the transmission of the sequence to the first user;

receiving a second request from the second user for the sequence, the receiving step occurring during the delaying step; and simultaneously transmitting the data sequence to the first and second users after the delaying step, the simultaneously transmitting step including the steps of
transmitting the data sequence to the first user along the first transmission path, and
transmitting the data sequence to the second user along the second transmission path.

3. An information retrieval system with a high bit rate to serve several users simultaneously, comprising:

a base of sequences of data elements, extraction circuits for extracting sequences of data elements from the base in response to a request of a first user, means to delay a transmission of a sequence of data elements to the first user, memory, the memory further comprising a list of additional users who have requested the sequence of data elements after the initiation of the delay, and interconnection circuits for interconnecting the base with the users, the interconnection circuits further comprising multiplexer means for simultaneously transmitting the same sequence of data elements to the first user and the additional users after the end of the delay.

4. An information retrieval system according to claim 3, wherein the delaying means comprise, in the extraction circuits, means to delay the extraction.

5. An information retrieval system according to claim 3, wherein the delaying means comprise, in the interconnection circuits, a memory to carry out the temporary storing of a sequence of extracted data elements and to enable the delaying of the transmission of this sequence of data elements.

6. An information retrieval system according to claim 3, wherein the delaying means comprise circuits to obtain a delay of a duration limited by a fixed value.

7. An information retrieval system according to claim 6, wherein the means to obtain a delay of a duration limited by a fixed value are triggered by the request of the first user.

8. An information retrieval system according to claim 6, wherein the means to obtain a delay of a duration limited by a fixed value are triggered periodically.

9. An information retrieval system according to claim 3, wherein the means for delaying the transmission of a sequence of data elements to the first user comprise circuits to delay this transmission by a variable period which begins with the request from the first user and ends when the number of additional users who send identical requests to this bases reaches a number fixed in advance.

10. An information retrieval system according to claim 9, wherein the number fixed in advance is fixed in advance by a counting of the number of users who send requests to the base during a previous given period, and wherein this number fixed in advance increases with the frequency of these requests during this previous period.

11. An information retrieval system according to claim 3, comprising a machine with parallel architecture to constitute the delaying means and/or the interconnection circuits.

12. An information retrieval system according to claim 3, comprising:

means to fragment a sequence of data elements into data blocks;

means to load i first blocks of this sequence into a buffer memory, and means to call for the loading of a block with a rank i+1 in this memory as soon as the first of the i blocks that is loaded therein has been extracted therefrom, and so on for the following blocks.

13. An information retrieval system with high bit rate to serve users, comprising:

a base of sequences of data elements that can be consulted by the users, each sequence of data elements comprising several blocks of data elements distributed in storage in different carriers used to memorize data elements, circuits for the interconnection of the carriers of the base with the users, to extract sequences of data elements out of this base in response to requests sent by the users, and to send the sequences to the users, the interconnection circuits further comprising:

a buffer memory to store blocks of data elements extracted from the carriers before the blocks of data are sent, and means to arrange the transmission, out of the buffer memory, of the blocks of data elements that are stored therein in an order that is independent of the temporal order of their extraction out of the base.

14. An information retrieval system according to claim 13, comprising:

means to load i first blocks of data elements of a sequence in the buffer memory, and means to call for the loading, in this buffer memory, of a block with a rank i+1 in this memory as soon as the first of the i blocks that had been loaded therein is extracted therefrom to be transmitted, and so on for the following blocks.

15. An information retrieval system according to claim 14, wherein the number i of blocks of data elements initially loaded in the buffer memory is greater than the ratio of the nominal sending bit rate to the nominal carrier bit rate.

16. An information retrieval system according to claim 13, comprising a machine with parallel architecture to constitute the interconnection circuits.

17. An information retrieval system according to claim 13, comprising:

means to delay a transmission of a sequence of data elements intended for a user, and wherein:

the interconnection circuits comprise multiplexer means for the simultaneous transmission of a same sequence of data elements to several users.

18. An information retrieval system according to claim 17, wherein the delaying means comprise, in the interconnection circuits, means to delay the sending of this sequence of data elements.

19. An information retrieval system according to claim 17, wherein the delaying means comprise circuits to obtain a delay of a duration limited by a fixed value.

20. An information retrieval system according to claim 19, wherein the means to obtain a delay of a duration limited by a fixed value include means to be triggered by a first request of a user.

* * * * *

UNITED STATES PATENT AND TRADEMARK OFFICE
CERTIFICATE OF CORRECTION

PATENT NO. : 5,548,792
DATED      : August 20, 1996
INVENTOR(S) : Gerard Babonneau It is certified that error appears in the above-indentified patent and that said Letters Patent is hereby corrected as shown below:

Title page item [73] add Assignee:

Telediffusion De France, Paris Cedex, France

Signed and Sealed this

Fourth Day of February, 19

Attest:

BRUCE LEHMAN

Attesting Officer

Commissioner of Patents and Trademarks